(No Model.)

H. WILSON.
FIRE FENDER.

No. 591,315. Patented Oct. 5, 1897.

Witnesses
John H. Holt
J. Stephen Ginsta

Inventor
Henry Wilson,
by Whitman & Wilkinson
Attorneys.

THE NORRIS PETERS CO., PHOTO-LITHO., WASHINGTON, D. C.

UNITED STATES PATENT OFFICE.

HENRY WILSON, OF RICHLAND, GEORGIA.

FIRE-FENDER.

SPECIFICATION forming part of Letters Patent No. 591,315, dated October 5, 1897.

Application filed February 13, 1897. Serial No. 623,314. (No model.)

*To all whom it may concern:*

Be it known that I, HENRY WILSON, a citizen of the United States, residing at Richland, in the county of Stewart and State of Georgia, have invented certain new and useful Improvements in Fire-Fenders; and I do hereby declare the following to be a full, clear, and exact description of the invention, such as will enable others skilled in the art to which it appertains to make and use the same.

My invention relates to improvements in fenders for fireplaces and the like; and it consists of certain novel features hereinafter described and claimed.

Reference is had to the accompanying drawings, in which the same parts are indicated by the same letters throughout the several views.

Figure 1:
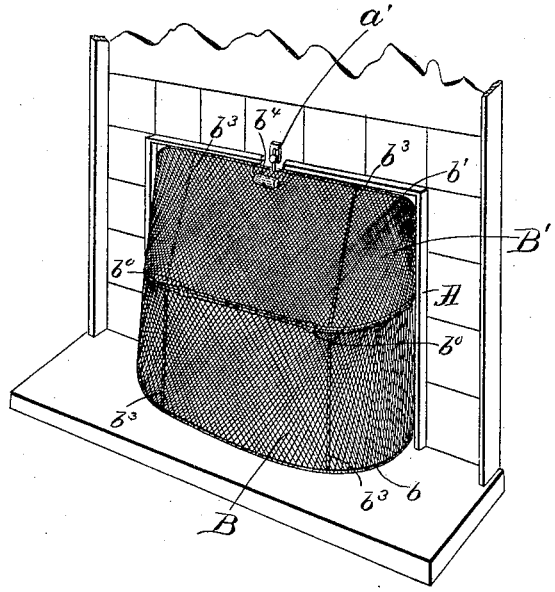
Figure 4:
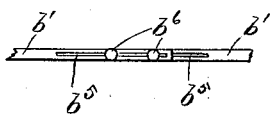
Figure 3:
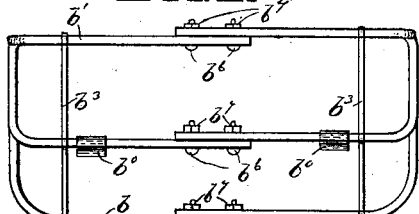
Figure 2:
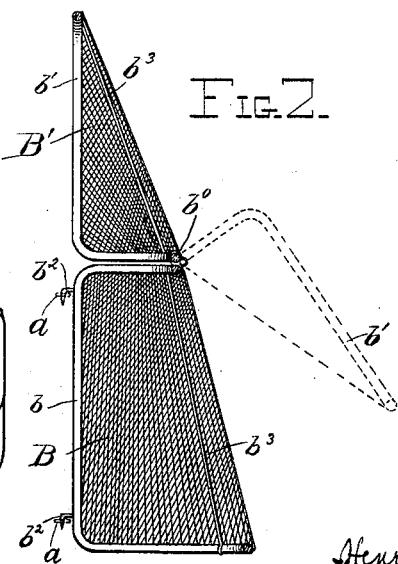

Figure 1 represents a perspective view of a fireplace of ordinary type provided with my improved fender. Fig. 2 represents a vertical section through the fender. Fig. 3 represents a plan view of a modified form of frame for the fender, and Fig. 4 represents a detail view showing the adjustable connection for the brace of the frame shown in plan in Fig. 3.

A represents a fireplace, preferably of ordinary construction and rectangular in shape; but the shape and construction of the fireplace may be varied at will, provided that the frames for the hereinafter-described fender be adjusted to suit the varying conditions.

The fender is composed of two parts, the lower fixed part B and the upper hinged part B', which is hinged to the lower part and is adapted to swing forward to the position shown in dotted lines in Fig. 2.

The frame of the lower fender $b$ is curved, as shown, and it is provided with hooks $b^2$ or other fastening devices adapted to engage in eyes $a$, or similar catches attached to the sides of the fireplace.

The upper member of the screen is normally held in the closed position, as shown in Fig. 1, by means of a spring-catch $a'$, and it is preferably provided with a handle $b^4$, by means of which it may be raised or lowered, as desired.

The two members of the fender are preferably provided with stiffening-braces $b^3$, and the whole is covered with coarse-mesh wire, whereby the escape of sparks or the falling out of any fire is prevented.

In order to adapt the fender to be fitted to various sizes of fireplaces, the frame is preferably made adjustable, as indicated in Figs. 3 and 4, where the frame of each member is made in two parts and slotted, as at $b^5$, and connected together by clamp-screws $b^6$ and nuts $b^7$. In this way the frame may be extended or contracted, and thus fireplaces of different dimensions may be fitted.

While I have shown the adjusting devices to adjust only the width of the frames, it will be obvious that the same may be made to adjust the height of the frames, as for fireplaces having different heights.

Having thus described my invention, what I claim, and desire to secure by Letters Patent of the United States, is—

1. A fender for fireplaces composed of two members, a lower member consisting of a frame covered with wire-netting, said lower member being detachably secured to the fireplace and adapted to inclose the lower portion of the same, and an upper member also composed of a frame covered with wire-netting and hinged to the top and front of the said lower member, adapted to swing outward from the said fireplace to open the fender and to inclose the upper portion of the said fireplace when closed, substantially as described.

2. A portable fire-fender made in the shape of a blower and composed of a two-part frame, said frame being covered with wire-netting, the two parts being hinged together, said frame being expansible to fit different sizes of fireplaces, and means for securing the frame in any adjusted position, the upper part of the fender being adapted to fold down over the lower part and being provided with a handle, substantially as described.

In testimony whereof I affix my signature in presence of two witnesses.

HENRY WILSON.

Witnesses:
JOHN H. HOLT,
F. C. YEATES.